UNITED STATES PATENT OFFICE.

WILLIAM M. WELLING, OF NEW YORK, N. Y.

IMPROVEMENT IN ARTIFICIAL IVORY.

Specification forming part of Letters Patent No. 17,949, dated August 4, 1857; extended seven years; reissue No. 5,019, dated July 30, 1872.

*To all whom it may concern:*

Be it known that I, WILLIAM M. WELLING, of the city, county, and State of New York, have invented and made a certain new and useful Improvement in Composition for Artificial Ivory; and the following is declared to be a full and correct description of the same.

This artificial ivory is made by the use of shellac and ivory-dust or its equivalent as the principal ingredients, and to these coloring matter is added, as required, for the particular article to be made. In order to make a strong composition, camphor or equivalent material is introduced to produce a more intimate union between the articles employed while under the operation of heat. This camphor evaporates more or less in the process of manufacture. I reduce the shellac to the form of a powder, and have the other ingredients, also, in a finely-powdered state. I then mix the various ingredients together and expose them in a suitable vessel to the operation of heat and stirring or mixing. For this purpose I find that a vessel heated by steam under pressure is preferable, and said heat should be about 240° to 280°, and the stirring can be performed by rotary scrapers or fingers; and I prefer that the other ingredients be heated and mixed before the camphor is introduced. When the mass is thus thoroughly heated and mixed, which requires from fifteen to forty minutes, I prefer to remove the same from the vessel and roll the mass between suitable rollers, heated by steam or otherwise to the desired temperature, say about 240° to 280°; and when the composition is thoroughly mixed and worked together I cut the same out while hot by suitable dies, or form the same up into any shape that may be required by any competent means. If the composition, after being rolled, is laid away to cool, it will be necessary again to heat it by laying it on a plate heated by steam or equivalent means previous to molding.

Billiard-balls, piano-keys, and similar articles that cannot now be made of fine ivory, except at great cost, can by my artificial ivory be made at comparatively little cost, and in a manner that articles are scarcely distinguishable from those of natural ivory.

The following-named ingredients and their proportions illustrate what I have employed for producing various colors:

White shellac, about ten ounces; impalpable white, (acetate of lead precipitated by sulphuric acid,) about four and one-half ounces; ivory-dust, about eight ounces; camphor, about five ounces.

Shellac, about eight and one-half ounces; impalpable white, about three ounces; ivory-dust, about eight ounces; camphor, about five ounces; vermilion, about one and one-half ounce.

Shellac, about eight and one-half ounces; impalpable white, about two and one-half ounces; ivory dust previously boiled in cochineal, about nine and one-half ounces; camphor, about five ounces; vermilion, about one and one-half ounce.

I claim as my invention—

1. The artificial ivory made by thoroughly mixing and combining the articles specified, or others having equivalent properties, substantially as specified.

2. The method herein specified of combining substances to form factitious ivory by mixing such substances in a finely-pulverized condition, and then heating, stirring, and rolling the mass, substantially as set forth.

Signed by me this 18th day of July, A. D. 1872.

Witnesses: W. M. WELLING.

CHAS. H. SMITH,

GEO. T. PINCKNEY.